UNITED STATES PATENT OFFICE.

ROBERT GNEHM, OF BASLE, SWITZERLAND, ASSIGNOR TO THE SOCIETY OF CHEMICAL INDUSTRY, OF SAME PLACE.

PRODUCTION OF CHLORINATED DERIVATIVES OF BENZALDEHYDE.

SPECIFICATION forming part of Letters Patent No. 315,932, dated April 14, 1885.

Application filed February 26, 1885. (No specimens.)

*To all whom it may concern:*

Be it known that I, ROBERT GNEHM, of Switzerland, residing at Basle, Switzerland, have invented new and useful Improvements in the Production of Chlorinated Derivatives of Benzaldehyde, which may be usefully employed as materials in the manufacture of coloring-matters, of which the following is a specification.

This invention relates to the preparation of chlorinated derivatives of benzaldehyde, which may be usefully employed as materials in the manufacture of coloring-matters suitable for printing and dyeing. The said derivatives are substitution products of benzaldehyde, and are obtained according to my invention by substituting chlorine for one or more atoms of hydrogen in the benzolic residue of benzaldehyde.

Now, my invention consists in effecting the said substitution by the joint action of iodine and pentachloride of antimony upon benzaldehyde with the assistance of heat.

As an example of the manner in which my invention may be carried into effect, I proceed as follows: About one part, by weight, of iodine is dissolved in about six parts, by weight, of benzaldehyde, and the solution thus obtained is then gradually mixed with about from fifty-five to seventy parts, by weight, of pentachloride of antimony, due care being taken to prevent an excessive rise of temperature. The mixture thus produced is then kept at a temperature of about 100° centigrade by the application of a water bath until the evolution of hydrochloric acid gas caused by the chlorine substitution has ceased, or nearly so. The result of the operation may afterward be separated by employing any of the following methods: According to one method, the result of the chlorinating operation is mixed with cold water under constant agitation, and the milky emulsion thus obtained is then treated with sulphuric ether, in order to extract therefrom the chlorinated derivatives of benzaldehyde. The ethereal extracts are afterward submitted to distillation until the sulphuric ether has been recovered. The residue remaining in the still has an oily consistence, and gradually solidifies upon being allowed to stand for some time, or more quickly upon being strongly refrigerated. According to another method of separation, the employment of sulphuric ether may be dispensed with by adding as much hydrochloric acid to the result of the chlorinating operation as will be found necessary to dissolve the antimony compounds contained therein. In this manner the chlorinated derivatives of benzaldehyde will become separated in the form of an oily layer, and may afterward be drawn off or decanted from the acid solution.

A further purification of the chlorinated derivatives of benzaldehyde thus obtained may, if thought desirable, be effected by digesting the same with a solution of bisulphite of soda and by decomposing the clear and filtered solution thus produced with hydrochloric acid according to the well-known method for preparing aldehydes in a purified condition.

By varying the proportions of pentachloride of antimony, as well as by varying the temperature in my above-described process, chlorinated products are obtained which contain various proportions of monochlorinated and dichlorinated benzaldehydes. A further separation of these products may, if necessary, be effected by fractional distillation and by the subsequent application of cold and pressure in order to separate the fluid from the solid fraction.

What I claim as new and original, and desire to secure by Letters Patent, is—

The process herein set forth of treating benzaldehyde with iodine and pentachloride of antimony under heat and separating the chlorinated substitution products of benzaldehyde thus produced by known methods, substantially in the manner above described.

In testimony whereof I have hereunto set my hand and seal in the presence of two subscribing witnesses.

ROBERT GNEHM. [L. S.]

Witnesses:
 GEORGE GIFFERD,
 CHAS. A. RICHTER.